US012630721B2

(12) United States Patent
Chen et al.

(10) Patent No.: US 12,630,721 B2
(45) Date of Patent: *May 19, 2026

(54) SURFACE COVERING WITH AN ULTRA-VIOLET (UV) CURABLE SURFACE COATING

(71) Applicant: Decoria Materials (Jiangsu) Co., Ltd, Zhenjiang (CN)

(72) Inventors: Hao Allen Chen, Ashburn, VA (US); Kun He, Zhenjiang (CN); Shangfei Sun, Chiping County (CN)

(73) Assignee: Decoria Materials (Jiangsu) Co., Ltd., Zhenjiang (CN)

( * ) Notice: Subject to any disclaimer, the term of this patent is extended or adjusted under 35 U.S.C. 154(b) by 128 days.

This patent is subject to a terminal disclaimer.

(21) Appl. No.: 18/594,853

(22) Filed: Mar. 4, 2024

(65) Prior Publication Data

US 2024/0199888 A1 Jun. 20, 2024

Related U.S. Application Data

(63) Continuation of application No. 18/182,035, filed on Mar. 10, 2023, now Pat. No. 11,920,056, which is a continuation of application No. 16/697,526, filed on Nov. 27, 2019, now Pat. No. 11,623,994, which is a continuation of application No. PCT/CN2017/086822, filed on Jun. 1, 2017.

(51) Int. Cl.

| | |
|---|---|
| *B32B 3/10* | (2006.01) |
| *B32B 27/08* | (2006.01) |
| *B32B 27/30* | (2006.01) |
| *B32B 33/00* | (2006.01) |
| *C08F 222/10* | (2006.01) |
| *C09D 4/00* | (2006.01) |
| *C09D 4/06* | (2006.01) |
| *C09D 133/14* | (2006.01) |
| *C08K 3/34* | (2006.01) |
| *C08K 5/47* | (2006.01) |

(52) U.S. Cl.
CPC ............... *C09D 4/00* (2013.01); *B32B 27/08* (2013.01); *B32B 27/30* (2013.01); *B32B 33/00* (2013.01); *C08F 222/1065* (2020.02); *C09D 4/06* (2013.01); *C09D 133/14* (2013.01); *B32B 2255/10* (2013.01); *B32B 2255/20* (2013.01); *B32B 2264/10* (2013.01); *B32B 2307/554* (2013.01); *B32B 2307/7145* (2013.01); *B32B 2471/00* (2013.01); *C08K 3/34* (2013.01); *C08K 5/47* (2013.01); *C08K 2201/005* (2013.01)

(58) Field of Classification Search
None
See application file for complete search history.

(56) References Cited

U.S. PATENT DOCUMENTS

| | | | |
|---|---|---|---|
| 6,297,297 B1 | 10/2001 | Brookman et al. | |
| 6,841,023 B2 | 1/2005 | Mott | |
| 7,022,257 B1 | 4/2006 | Ohkido et al. | |
| 2002/0014297 A1 | 2/2002 | Mott et al. | |
| 2005/0118379 A1 | 6/2005 | Anderson et al. | |
| 2008/0017307 A1 | 1/2008 | Ong et al. | |
| 2008/0286592 A1 | 11/2008 | Smelansky et al. | |
| 2014/0178694 A1 | 6/2014 | Reenberg et al. | |
| 2015/0252209 A1* | 9/2015 | Tian .......................... E04B 1/92 | 428/447 |
| 2016/0153190 A1* | 6/2016 | Doehring ................ B32B 21/02 | 428/192 |

FOREIGN PATENT DOCUMENTS

| | | |
|---|---|---|
| CN | 104603216 A | 5/2015 |
| EP | 2890749 A1 | 7/2015 |
| FR | 2597529 A2 | 10/1987 |
| JP | H09226068 A | 9/1997 |
| JP | 2001129938 A | 5/2001 |
| JP | 5545331 B2 | 7/2014 |
| JP | 5910147 B2 | 4/2016 |
| JP | 2016168788 A * | 9/2016 |
| KR | 101726574 B1 | 4/2017 |
| WO | 03054045 B2 | 7/2003 |
| WO | 2011014139 A1 | 2/2011 |
| WO | 2014036462 A1 | 3/2014 |
| WO | 2014116511 A1 | 7/2014 |

OTHER PUBLICATIONS

Machine translation of JP-2016168788-A (Year: 2016).*
Notification, and The International Search Report and the Written Opinion of the International Searching Authority, PCT/CN2017/086822/dated Mar. 2, 2018, 11 pages.
European Patent Office Communication, Application No. 17 911 405.3-1107, dated Aug. 23, 2021, 7 pages.

(Continued)

*Primary Examiner* — Christopher M Polley

(74) *Attorney, Agent, or Firm* — Barley Snyder

(57) ABSTRACT

A surface covering is provided and generally includes a laminated panel, an ultra-violet (UV) and a second coating. The curable surface coating is applied to the laminated panel and includes a first coating. The second coating includes a composition distinctive of the first coating and is cured at a lower energy than the second coating. The second coating is cured at a higher energy to cure both the first coating and the second coating.

20 Claims, No Drawings

(56)  References Cited

OTHER PUBLICATIONS

Chinese First Office Action, PCT App No. PCT/CN2017/086822, dated Feb. 5, 2021, 6 pages.

European Patent Office Communication, App. No. 17 911 405.3-1107, dated Jun. 9, 2022, 8 pages.

Chinese Office Action, App. No. 201880082501.5, dated Dec. 23, 2021, 8 pages.

Chinese Office Action dated May 19, 2025, corresponding to Application No. 201780091478.1, 9 pages.

European Patent Office Examination Report dated Jul. 30, 2025, corresponding to Application No. 17 911 405.3-1102, 5 pages.

* cited by examiner

SURFACE COVERING WITH AN ULTRA-VIOLET (UV) CURABLE SURFACE COATING

CROSS-REFERENCE TO RELATED APPLICATIONS

This application is a continuation of U.S. patent application Ser. No. 18/182,035 filed on Mar. 10, 2023, which is a continuation of U.S. patent application Ser. No. 16/697,526 filed Nov. 27, 2019, now issued U.S. Pat. No. 11,623,994, which is a continuation of PCT International Application No. PCT/CN2017/086822 filed on Jun. 1, 2017.

FIELD OF THE INVENTION

The invention generally relates to a surface covering and, more specifically, to a surface covering having an ultra-violet (UV) curable surface coating.

BACKGROUND

Luxury vinyl tiles ("LVT") having polyvinyl chloride ("PVC") as a main component is generally well known. Furthermore, use of ultra-violet (UV) curable surface coatings on LVT surface coverings is also well known, since these coatings provide excellent surface properties in stain and chemical resistance, gloss retention, scuff resistance and cleanability. However, the price and the brittleness of known ultra-violet (UV) curable surface coatings prohibit heavy application. Typically, known ultra-violet (UV) curable surface coatings are applied only 1-2 mils thick on the outmost layer of the surface coverings. The wear-through of this ultra-violet (UV) curable surface coating before the end of the entire service life of surface coverings, particularly in the commercial and industrial environment, is always a concern from the manufacturer. Therefore, there is a significant need to improve the wearability of ultra-violet (UV) curable surface coating by the foot traffic and by scrubbing the flooring from the daily cleaning maintenance.

In many cases, ultra-violet (UV) curable surface coating systems will also added an ant-microbial and/or a fungicide to protect surface coverings from growing a wide ranges of bacterial, fungal and algal organisms. However, adding antimicrobial additives to an ultra-violet (UV) curable surface coating is expensive and typically costs several hundred dollars per pound. As a result, there is a cost deterred in using large amounts or high concentrations of these additives in most products. However, since inhibiting the growth and the existence of the microorganisms is expected to last the entire service life of the flooring, there is a need for an ultra-violet (UV) curable surface coating having antimicrobial additives that has great wear-ability and the durability to achieve the long-term efficacy against the growth of microorganism.

SUMMARY

Accordingly, the present invention was devised in light of the problems described above, a surface covering is provided and generally includes a laminated panel, an ultra-violet (UV) and a second coating. The curable surface coating is applied to the laminated panel and includes a first coating. The second coating includes a composition distinctive of the first coating and is cured at a lower energy than the second coating. The second coating is cured at a higher energy to cure both the first coating and the second coating.

DETAILED DESCRIPTION OF THE EMBODIMENT(S)

The following text sets forth a broad description of various exemplary embodiments of the invention. The description is to be construed as exemplary only and does not describe every possible embodiment since describing every possible embodiment would be impractical, if not impossible. It will be understood that any feature, characteristic, component, composition, ingredient, product, step or methodology described herein can be deleted, combined with or substituted for, in whole or part, any other feature, characteristic, component, composition, ingredient, product, step or methodology described herein. Numerous alternative embodiments could be implemented, using either current technology or technology developed after the filing date of this patent, which would still fall within the scope of the claims. All publications and patents cited herein are incorporated herein by reference.

Unless defined otherwise, all technical and scientific terms used herein have the same meaning as commonly understood by one of ordinary skill in the art to which this invention belongs. In case of conflict, the present application including the definitions will control. Also, unless otherwise required by context, singular terms shall include pluralities and plural terms shall include the singular. All publications, patents, and other references mentioned herein are incorporated by reference in their entireties for all purposes.

Unless otherwise specified, when the following abbreviations are used herein, they have the following meaning:

As used herein, the terms "comprises," "comprising," "includes," "including," "has," "having," "contains," or "containing," or any other variation thereof, will be understood to imply the inclusion of a stated integer or group of integers but not the exclusion of any other integer or group of integers. For example, a composition, a mixture, a process, a method, an article, or an apparatus that comprises a list of elements is not necessarily limited to only those elements but can include other elements not expressly listed or inherent to such composition, mixture, process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, the indefinite articles "a" and "an" preceding an element or component of the invention are intended to be nonrestrictive regarding the number of instances, that is, occurrences of the element or component. Therefore "a" or "an" should be read to include one or at least one, and the singular word form of the element or component also includes the plural unless the number is obviously meant to be singular.

The term "invention" or "present invention" as used herein is a non-limiting term and is not intended to refer to any single embodiment of the particular invention but encompasses all possible embodiments as described in the application.

The terms "about" and "approximately," when referring to a numerical value or range is intended to encompass the values resulting from experimental error that can occur when taking measurements. Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or subranges encompassed within that range as if each numerical value and sub-range is explicitly recited. For example, a weight range of about 1 weight percentage (wt %) to about 20 weight percentage (wt %) should be interpreted to include not only the explicitly recited concentration limits of 1 wt % to approximately 20 wt %, but also to include individual concentrations such as 2 wt %, 3 wt %, 4 wt %, and sub-ranges such as 5 wt % to 15 wt %, 10 wt % to 20 wt %, etc.

An exemplary floor panel includes a laminate section prepared from laminated polymeric components and a coating. In particular, the floor panel includes an ultra-violet (UV) curable surface coating according to the invention.

Each floor panel is prepared from laminated polymeric components, including vinyl, forming several layers. The total thickness of each floor panel, in the embodiments shown is approximately 4-6 mm. However, it is also possible to prepare the floor panel having one or more layers, with each layer having differing thickness. The composition of the floor panel may vary as well, with the floor panel being prepared from various materials, including but not limited to polymers, ceramics, metals, organic materials, etc.

The exemplary floor panel is prepared as a laminate having a top layer of flexible polymeric sheet material, a middle layer of flexible polymeric material, a base layer prepared from a more rigid polymeric material, and an ultra-violet (UV) curable surface coating applied to a surface thereof.

Each of the layers has different thickness, as shown. However, it is possible to have layers of equal thicknesses. The thickness, layering, and overall floor panel preparation would accord to preferences of the finished product, including dimensions. The manufacturing is not held to one specific design, but rather incorporates the novel design features described in the following paragraphs.

According to the invention, the floor panel, which can be shaped as either a square or rectangle, has four sides wherein each side is connected by interior angles of 90° (right angles). Additionally, the floor panel includes a top side and a bottom side. In the embodiment shown, the top side is prepared from the top layer and the bottom side is prepared using the base layer. Then, the ultra-violet (UV) curable surface coating according to the invention is then applied to the top layer to impart outstanding surface properties in scratch and slip resistance as well as the long efficacy of the antimicrobial performance.

The exemplary floor panel is prepared from various laminate components. In the embodiment shown, the top layer is prepared having three components: a durable wear layer and an ornamental layer, with the ornamental layer having printed features. Any of the component pieces, such as the durable wear layer or the ornamental layer, may be textured in order to enhance features of the floor panel construction.

In the embodiment shown, the ornamental layer is provided having a printed pattern, with the underside of the ornamental layer being bonded to the middle layer and the printed pattern facing away from the base layer. The top layer provides graphics and texture relief, and can be prepared to match any print or even mimic genuine metamorphic rock features.

The top layer further includes a transparent wear layer, in the embodiment shown. The wear layer would be prepared from polyvinyl chloride or other polymeric material, such as polyolefin, thermoplastic polyurethane. (TPU) or ethylene vinyl acetate (EVA) etc. The wear layer is utilized to protect the ornamental layer. And since the wear layer is transparent or clear, then any aesthetic print on the ornamental layer would be visible through the wear layer. Although the thickness may vary, the wear layer would range from 0.1-1.0 mm. Quite often, the thickness of the wear layer and the overall thickness of the product are dictated by customers; the thickness of the wear layer has a significant impact to overall floor panel construction and formulas of base layers used.

The ornamental layer can be used to provide the floor panel with printed graphics, which would be used to enhance the aesthetics of the floor panel. Additionally, the ornamental layer may provide material properties that neither the top or base layers may provide, based on material composition. In the embodiment, the ornamental layer would be a decorative layer having a printed design on a top surface of the ornamental layer. The thickness of the ornamental layer can be vary. However, in the embodiment shown, the ornamental layer is prepared having a thickness around 0.07 mm. Although the top layer is positioned on top of the middle layer, the top layer is transparent allowing any printed pattern on the top surface of the middle layer to be easily seen.

During manufacturing, the top layer may be prepared with textured features to enhance the feel of the floor panel. Therefore, if the top layer is prepared with a printed pattern and a textured surface, the floor panel will have a presentation and feel of genuine ceramic or metamorphic rock flooring. The embossed surface texture on the clear wear layer can be in perfect alignment with the underneath printed decorative layer to enhance the realism of the design. This is called "embossed in register" in the industry.

According to the invention, the middle layer is prepared from a single layer of high density plastic. However, to meet the need for preferred properties, the middle layer may be prepared from a homogenous blend of polyvinyl chloride (resin) and other material additives, such as cork particles or glass fibers. In the embodiment shown, the middle layer connects with the top layer and the base layer.

Since the middle layer may include is a homogenous blend of polyvinyl chloride (having high density) and material additives, the floor panel can meet preferred material properties, such as improved rigidity, strength, thermal conductivity, resiliency, and noise reduction properties. The thickness of the middle layer may vary. However, in the embodiment shown, the middle layer is prepared having a thickness ranging from 1.5-2.7 mm.

The base layer, which is optional as well, is prepared from a single layer of high density plastic. The base layer functions as a backing layer. Further, the base layer will maintain connection with adjacent floor panels or existing floor boards. Therefore, the floor panel will include a fastening source, which may be an pre-applied adhesive prepared on the underside of the base layer. Alternatively, the fastening source may be a locking system on the sides of the floor panel, which may allow connection of several floor panels to be a floating installation.

Additionally, the base layer may be provided to balance the top layer, essentially averting warping of the floor panel. Although the base layer thicknesses may vary, it is appropriate to provide the base layer having a thickness ranging from 0.3-2.5 mm. The base layer could be prepared from a variety of materials, including but not limited to polyvinyl chloride, polyolefin, thermoplastic polyurethane. (TPU) or ethylene vinyl acetate (EVA). The composition would depend on the intended application of the floor panel.

In the embodiment shown, the floor panel is prepared using a known hot press manufacturing process. The durable wear layer and an ornamental layer may be pre-bonded before the layers are appropriately positioned on top of each other and then bonded together using heat and pressure.

Although the layering and dimensions of the floor panel are a matter of choice, a suitable thickness for the top layer, the middle layer and the base layer can be for example, 4-6 mm.

A typical procedure for manufacturing each of the layers is as follows. PVC powder and other material additives are added together and mixed uniformly in a Banbury Mixer. The mixture is then heated to a temperature of 150-215° C. to produce a hot melt. The melt is then worked through a Calendar roll mill heated to a similar temperature. The shear mixing action on the surface of the Calendar rollers fluxes the melt and a polymer sheet having a controlled thickness is produced. The thickness of the polymer sheet is controlled by adjusting the gap between the Calendar rolls. The calendered sheets are then cooled and collected on a reel.

A typical procedure for the manufacture a laminated section of the floor panel involves compressing the layers under heat and pressure with an embossing plate having a desired texture that typically mimics natural wood, ceramic, stone, slate, or brick designs.

In an exemplary embodiment, a laminated section of the floor panel may be prepared by laminating together the following sequence:

(1) one or more base layer;

(2) a middle layer;

(3) a ornamental layer having a print film; and (4) a clear wear layer.

An embossing plate is placed on top of the above assembled stack. The stack is then heated to approximately 130° C.-150° C. and approximately 3-5 MPa of pressure is applied through the embossing plate for about 20-30 minutes. The press is then cooled to 300-50° C. and the laminated section of floor panel is removed.

Furthermore, the laminated section is cooled down for few hours and then the ultra-violet (UV) curable surface coating is applied on top side surface of floor panel. The coating process will be described below.

According to the invention, the ultra-violet (UV) curable surface coating includes an exemplary composition having an oligomer, a monomer, a photoinitiator, abrasive resistant particles, and an antimicrobial additive. The amounts of the composition components are expressed in weight percentage ("wt %").

In an exemplary embodiment, the oligomer is an acrylate resin. In particular the oligomer may consists of any one of the following resins: (a) urethane acrylate oligomer, (b) epoxy acrylate oligomer, (3) polyester acrylate oligomer, or (4) silicone acrylate oligomer.

The oligomer contributes substantially to specific properties to the finished product. For instance, acrylate urethanes crosslink into tough but flexible film which exhibits good abrasive and mar resistant coatings, while acrylate epoxies transform into a harder coating that provides robust adhesion with a floor covering and enhances chemical stain resistance.

In an exemplary embodiment, the ultra-violet (UV) curable surface coating composition includes an oligomer at about 40 to about 70 weight percentage (wt %). In another exemplary embodiment, the oligomer is about 50 to about 70 wt %. In yet another embodiment, the oligomer is about 55 to about 65 wt %. In another embodiment, the oligomer is about 40 to about 60 wt %. In yet another embodiment, the oligomer is about 44 to about 55 wt %.

Many oligomer resins are proprietarily developed by resin manufacturers for the coating formulators. In general, the urethane acrylate oligomers are prepared according to the diisocyanate-polyadditional principle. The isocyanate group from urethane reacts with polyester or polyether hydroxyl functional acrylate to form polymer structure. Due to the versatility of isocyanate compounds and wide selection of polyols materials, there is a countless number of oligomers can be developed to meet the needs of coating developers. For the flooring application, it is preferred to use aliphatic isocyanates such as hexamethylenediamine (HAD) because of the light stability requirement. Sartomer/Arkema Group offers many urethane acrylate oligomers for selection. For instance, CN9001NS is designed for the coating required good weathering stability and adhesion; CN9007NS imparts abrasion resistance and flexibility.

In an exemplary embodiment, the monomer is a monofunctional monomer, a difunctional monomer, or a multifunctional monomer. The monomer contributes substantially to specific properties to the finished product. For instance, the monomer controls the viscosity, cure rate, of the ultra-violet (UV) curable surface coating. The monomer may crosslink with oligomers.

The monomer may include a monofunctional monomer, such as acrylic acid, N-vinyl-2-pyrrolidone, isobornyl acrylate and esters of acrylic, and methacrylic acid derivatives. The monofunctional monomers is used to lower the viscosity to compensate certain viscous oligomers in the ultra-violet (UV) curable surface coating. In addition, the monofunctional monomer promotes adhesion to nonporous surfaces of the floor panel substrate and impart in the ultra-violet (UV) curable surface coating.

The monomer may include a difunctional monomer, such as tripropylene glycol diacrylate (TPGDA), 1,6 hexanediol diacrylate (HDDA), dianol diacrylate (DDA), neopentyl glycol diacrylate (NPGDA), hexamethylene diacrylate, and 1,4 butane diol diacrylate (BDDA). The difunctional monomer may be used since it highly reactive. Additionally, the difuctional monomer provides toughness and robust adhesion, and is a good solvent with the oligomer.

The monomer may include a trifunctional monomer, such as trimethylol propane triacrylate (TMPTA) or pentaerythritol triacrylate (PETA). The trifunctional monomer may be used since they are higher in viscosity and extremely reactive. The trifunctional monomer provides higher crosslinking density of the ultra-violet (UV) curable surface coating, which improves hardness and abrasion resistance thereof.

In an exemplary embodiment, the ultra-violet (UV) curable surface coating may include one or more monomers at about 15 to about 55 weight percentage (wt %). In an exemplary embodiment, the monomer is about 25 to about 40 wt %. In yet another embodiment, the ultra-violet (UV) curable surface coating composition includes a first monomer at about 25 to about 35 wt % and a second monomer at about 1 to about 5 wt %. In yet another embodiment, the ultra-violet (UV) curable surface coating composition includes a first monomer at about 15 to about 25 wt % and a second monomer at about 5 to about 15 wt %. In yet another embodiment, the ultra-violet (UV) curable surface coating composition includes a first monomer at about 15 to about 25 wt %, a second monomer at about 5 to about 15 wt %, and a third monomer at about 1 to about 5 wt %.

Polymerization can be substantially accelerated by a wide variety of initiators. According to the invention, the photoinitiator is used during a radiation curing process of the ultra-violet (UV) curable surface coating. When the ultra-violet (UV) curable surface coating is exposed to ultra-violet (UV) light, free radical intermediates are formed and the reaction of these radicals with unsaturated groups on the oligomer and monomer initiates polymerization. At the end of the polymerization, the ultra-violet (UV) curable surface coating becomes a solid 3-dimensional solid matrix.

In an exemplary embodiment, the photoinitiator may be a benzophenone, benzophenone derivatives, benzoin, benzoin derivatives, acetophenone, acetophenone derivatives, aromatic ketone amine systems, such as hydroxycyclohexyl phenyl ketone.

In an exemplary embodiment, the ultra-violet (UV) curable surface coating may include one or more photoinitiators at about 1 to about 20 weight percentage (wt %). In an exemplary embodiment, the photoinitiator is about 1 to about 10 wt %. %. In yet another embodiment, the ultra-violet (UV) curable surface coating composition includes a photo initiator at about 1 to about 10 wt % and a second photoinitiator at about 1 to about 10 wt %. In yet another embodiment, the ultra-violet (UV) curable surface coating composition includes a first photoinitiator at about 1 to about 5 wt % and a second photoinitiator at about 1 to about 5 wt %.

According to the invention, abrasive, wear resistant particles are used to provide abrasion resistance to the top surface of the floor covering 1. In particular, the abrasive, wear resistant particles, according to the invention, are macrocrystalline or single crystalline mineral abrasive particles.

In an exemplary embodiment, the abrasive, wear resistant particles include silicon carbide (SiC) particles. Silicon carbide (SiC) particles provide benefits to the ultra-violet (UV) curable surface coating, which include low density, high strength, low coefficient of thermal expansion, high thermal conductivity, good electrical properties, high decomposition temperature (~4530 F), oxidation resistance, and corrosion resistance (i.e. alkaline and acidic). Since silicon carbide (SiC) is the third hardest material after diamond and boron carbide, use of silicon carbide (SiC) particles in the ultra-violet (UV) curable surface coating promotes great wear application.

When the ultra-violet (UV) curable surface coating is exposed to ultra-violet (UV) light, a crosslinking reaction occurs, the ultra-violet (UV) curable surface coating temperature increases and shrinkage of the cured ultra-violet (UV) curable surface coating follows. Therefore, use of the silicon carbide (SiC) particles minimizes shrinkage of the ultra-violet (UV) curable surface coating and alleviates the up curing when applied to the floor panel.

In an exemplary embodiment, the ultra-violet (UV) curable surface coating include silicon carbide (SiC) particles wherein 50% of the silicon carbide (SiC) particles have particle size less than 45 mu. In another exemplary embodiment, the ultra-violet (UV) curable surface coating include silicon carbide (SiC) particles wherein 90% of the silicon carbide (SIC) particles have particle size less than 45 mu.

In an exemplary embodiment, the ultra-violet (UV) curable surface coating composition includes silicon carbide (SiC) particles at about 1 to about 20 weight percentage (wt %). In an exemplary embodiment, the silicon carbide (SiC) particles at about 5 to about 15 weight percentage (wt %).

Using the antimicrobial additive in the ultra-violet (UV) curable surface coating is to maintain the cleanliness and sanitation of the floor panel because antimicrobial additive can inhibit the growth of many variety of microorganisms, which reduces the bacterial infection and other related diseases. There are few effective antimicrobial additives in the marketplace such as Silver content material. Although the efficacy of silver type antibacterial against numerous bacterial were well documented, the concern of carcinogen suspect of silver as a heavy metal has driven consumers away from using it as a mean of fighting bacterial. Therefore, according to the invention, the ultra-violet (UV) curable surface coating composition includes an antimicrobial additive composition for imparting antimicrobial characteristics to the ultra-violet (UV) curable surface coating. The antimicrobial additive composition includes a quantity of an antimicrobial agent, such as N-butyl-1, 2-benzisothiazolin-3-one, commonly known as Butyl-BIT (BBIT) and is commercially available from Avecia Chemical under the tradename VANQUISH. One skilled in the art should appreciate that other known antimicrobial agents could be used including alkyl dimethyl ammonium saccharinates, Zinc 2-pyridinethiol-1-oxide, 10,10'-Oxybisphenoxarsine (OBPA), 4,5-Dichloro-2-octyl-4isothiazolin-3-one (DCOIT) and mixtures thereof.

N-butyl-1, 2-benzisothiazolin-3-one is an organic type of antimicrobial/antifungal additive and demonstrates excellent control of a wide range of bacterial, fungal and algal organisms that protect the surface of flooring surface from producing offensive odors and aesthetic problem such as staining or black molds. N-butyl-1, 2-benzisothiazolin-3-one can be applied as a liquid that is easy to mix with to the ultra-violet (UV) curable surface coating. The efficacy of N-butyl-1, 2-benzisothiazolin-3-one has shown effectively against numerous fungi (such as *Phoma violacea, Aurcobasidium pullulans, Cladosporium cladosoroides, Chaetomium globosum, Cladosporium herbarum*, among others) and bacteria (such as *Bacillus cereus, Bacillus subtilis, Enterococcus* faccalis 2, *Listeria monocytogenes* 10, *Escherichia coli* 10, *Staphylococcus aureus* 5 and many others).

Considering the abrasive and scratch resistance of the to the ultra-violet (UV) curable surface coating, from other additives of the composition, such as the silicon carbide (SIC) particles, the longevity of the hygienic effect is improved.

In an exemplary embodiment, the ultra-violet (UV) curable surface coating composition includes an antimicrobial additive at about 0.05 to about 1.0 weight percentage (wt %). In an exemplary embodiment, the antimicrobial additive is at about 0.1 to about 0.5 weight percentage (wt %).

In an exemplary embodiment, the ultra-violet (UV) curable surface coating may include one or more additive agents such as a wetting agent, a dispersing agent, a defoamer, and a flatting agent. A silica flatting agent may also be sued to control the gloss level of the ultra-violet (UV) curable surface coating. Because both the flatting agent and abrasive, wear resistant particles are heavy, preparation of the ultra-violet (UV) curable surface coating involves a dispersing process with selected surfactants.

In an exemplary embodiment, the ultra-violet (UV) curable surface coating composition includes additive agents at about 5 to about 20 weight percentage (wt %). In an exemplary embodiment, the ultra-violet (UV) curable surface coating composition includes a first additive agent at about 5 to about 15 weight percentage (wt %) and a second additive agent at about 1 to about 3 weight percentage (wt %). In an exemplary embodiment, the ultra-violet (UV) curable surface coating composition includes a first additive agent at about 5 to about 15 weight percentage (wt %), a second additive agent at about 1 to about 3 weight percentage (wt %), and a third additive agent at about 1 to about 3 weight percentage (wt %).

An exemplary coating process for applying a ultra-violet (UV) curable surface coating to a floor panel will be described.

A heterogeneous 5.0 mm floor panel is provided and includes a clear protective layer (0.5 mm) 12, an ornamental layer with a printed film (0.07 mm), a middle layer (1.5 mm), an optional fiber glass scrim, an intermediate base layer (1.5 mm), and a bottom base layer (1.5 mm).

The layers are laminated with heat and pressure in a hot press for sufficient time to bond each individual layer into one fully consolidated, inseparable floor panel. The floor panel is then treated with ultra-violet (UV) curable surface coating according to the invention.

In an exemplary embodiment of the invention, the ultra-violet (UV) curable surface coating is a two-coat system applied to a floor panel, using a $1^{st}$ coating that has a composition distinctive of the $2^{nd}$ coating. The $1^{st}$ coating of the ultra-violet (UV) curable surface coating is applied and cured at lower energy to form a B-stage of the curing process. Then a $2^{nd}$ high performance coating is then applied on top of the $1^{st}$ coating system, and then cured with sufficient energy to fully cure both coatings combined.

An exemplary application of a two-coat system for the ultra-violet (UV) curable surface coating is as follows:

(1) Temperature for the $1^{st}$ coating of the ultra-violet (UV) curable surface coating is maintained at 30°-40° C.;

(2) The $1^{st}$ coating is then pumped to the reservoir at the center of a roll coater;

(3) The gap between two roll metering the application rate is set to apply 9-10 grams/square meter of the coating weight, which amounts of coating is equivalent to 12 mμ-13 mμ.

(4) The floor panel is placed on a conveyor and sent through a $1^{st}$ coater so that the op surface of the floor panel comes to contact with an applicator roll that applies the $1^{st}$ coating onto the top surface of the floor panel.

(5) The conveyor the carries the floor panel (with the $1^{st}$ coating applied thereto) into a first ultra-violet (UV) curing chamber. The first ultra-violet (UV) curing chamber includes 4 banks of ultra-violet (UV) lamps, with each lamp capable of emitting up to 250 watts/cm light intensity.

(6) The light intensity is set to the medium to the lower level, so the UV curing energy is set at 300 millijoules/cm2 as needed for the B-stage curing.

(7) After the $1^{st}$ coating is semi-cured, the floor panel is carried by the conveyor belt to the $2^{nd}$ coater and the $2^{nd}$ coating is applied thereto.

(8) The $2^{nd}$ coating weight is 9-18 grams/square meter based on the performance requirement.

(9) The conveyor then carries the floor panel (with the $2^{nd}$ coating applied thereto) into a second ultra-violet (UV) curing chamber. The second ultra-violet (UV) curing chamber includes 4 banks of ultra-violet (UV) lamps, with each lamp capable of emitting up to 250 watts/cm light intensity. The light intensity is set higher than the first ultra-violet (UV) curing chamber, so the UV curing energy is set at about 700 millijoules and above. The total curing energy combined of $1^{st}$ and $2^{nd}$ curing is around 1000 millijoules.

An exemplary embodiment of a two-coat system for the ultra-violet (UV) curable surface coating will now described through the following examples.

Example I

Table 1 discloses an exemplary embodiment of a $1^{st}$ coating of the ultra-violet (UV) curable surface coating according to the invention. The $1^{st}$ coating is the base coat of the ultra-violet (UV) curable surface coating in the two-coat system.

TABLE 1

| Ingredients | % by weight |
| --- | --- |
| urethane acrylate oligomer | 40-60 |
| hexamethylene diacrylate | 15-25 |
| Tri (propylene glycol) diacrylate | 5-15 |
| isodecyl acrylate | 5-15 |
| benzophenone | 1-5 |
| hydroxycyclohexyl phenyl ketone | 1-5 |
| silica flatting agent | 5-15 |
| N-butyl-1,2-benzisothiazolin-3-one | 0.1-0.5 |
| additional additives and other diluents | 2-6 |

Exemplary curing conditions for the $1^{st}$ coating are as follows:

Viscosity cps @ 35° C.: 800-1200 cps;

Density: 1.09 grams/ml at 25° C.;

Film Thickness (microns): 13-25 microns; and

Cure Energy: 250-300 millijoules/cm$^2$.

Table 2 discloses an exemplary embodiment of a $2^{nd}$ coating of the ultra-violet (UV) curable surface coating according to the invention. The $2^{nd}$ coating is the top coat of the ultra-violet (UV) curable surface coating in the two-coat system.

TABLE 2

| Ingredients | % by weight |
| --- | --- |
| urethane acrylate oligomer | 50-70 |
| hexamethylene diacrylate | 25-35 |
| isodecyl acrylate | 1-5 |
| benzophenone | 1-5 |
| hydroxycyclohexyl phenyl ketone | 1-5 |
| silica flatting agent | 5-15 |
| Silicon carbide (SiC) particles | 5-15 |
| N-butyl-1,2-benzisothiazolin-3-one | 0.1-0.5 |
| additional additives and other diluents | 1-3 |

Exemplary curing conditions for the $2^{nd}$ coating are as follows:

Viscosity cps @ 35° C.: 800-1200 cps;

Density: 1.18 grams/ml at 25° C.;

Film Thickness (microns): 13-25 microns; and

Cure Energy: 600-800 millijoules/cm 2.

Now, surface properties of the exemplary embodiment of a two-coat system for the ultra-violet (UV) curable surface coating from Example 1 will be detailed through the following tables.

Table 3 displays results of measured surface properties of the exemplary embodiment of the ultra-violet (UV) curable surface coating according to the invention in Example 1. In particular, table 3 discloses results from a standard test method for resistance to chemicals of resilient flooring, as provided under ASTM F925-13. Chemical reagents were placed onto the surface of the Example 1 test samples for 60 minutes before being cleaned with isopropanol or mineral spirits. The measured resistance to chemical reagents were based on a rating scale of 0-3 level, wherein 0 identifies no change, 1 identifies a slight change, 2 identifies a moderate change, and 3 identifies a severe change.

TABLE 3

| Resistance to Chemicals (ASTM 925) Reagents | Ratings |
| --- | --- |
| White Vinegar (5% acetic acid) | 0 |
| Rubbing Alcohol (70% isopropyl alcohol base) | 0 |
| White Mineral Oil | 0 |
| NaOH Solution (5%) | 0 |
| HCl Solution (5%) | 0 |
| $H_2SO_4$ Solution (5%) | 0 |
| Household Ammonia Solution (5% $NH_4OH$) | 0 |
| Household Bleach (5.25% NaOH) | 0 |
| Disinfectant - Phenol Type (5% active phenol) | 0 |
| Kerosene | 0 |
| Olive Oil | 0 |
| Unleaded Gasoline | 0 |

Table 4 displays results of measured surface properties of the exemplary embodiment of the ultra-violet (UV) curable surface coating according to the invention in Example 1. In particular, table 4 discloses results from a standard test method for resistance to chemicals of resilient flooring, as provided under ASTM F925-13. Chemical stainants were placed onto the surface of the Example 1 test samples for 60 minutes before being cleaned with isopropanol or mineral spirits. The measured resistance to chemical stainants were based on a rating scale of 0-3 level, wherein 0 identifies no change, 1 identifies a slight change, 2 identifies a moderate change, and 3 identifies a severe change.

TABLE 4

| Resistance to Chemicals (ASTM 925) Reagents | Ratings |
| --- | --- |
| Sharpie Blue Marker | 0 |
| Sharpie Black Marker | 0 |
| Kiwi Brown Shoe Polish | 0 |
| Driver Sealer | 0 |
| Iodine | 1 |
| Mustard | 0 |

Table 5 displays results of measured surface properties of the exemplary embodiment of the ultra-violet (UV) curable surface coating according to the invention in Example 1. In particular, table 4 discloses results from observed and measured scratch resistance of the ultra-violet (UV) curable surface coating according to the invention in Example 1. The procedure used to determine the scratch resistance of the coating is based on an apparatus of Mini-Martindale Abrasion and Pilling tester model 401. In this method, a 3.5" abrading top plate (125 grams) with a 3.5" 3M Scotch-Brite Scratch Pad 07447 was provided with an added 260 grams of weights on the top of the top plate. A test sample was positioned at the center of the abrading table, so the scratch pad will move across machine direction of the coated sample. The apparatus was run for 25 cycles and ten visually inspected and rated for 1) whiting-amounts of coating being abraded off, and 2) scratches. This procedure was then performed again after an additional 260 grams of weight was placed on the top plate. The measured scratch resistance was based on a rating scale of 0-3 level, wherein 0 identifies no change, 1 identifies a slight change, 2 identifies a moderate change, and 3 identifies a severe change.

TABLE 5

| Observation Condition | Ratings |
| --- | --- |
| Whiting @ 385 grams | 0 |
| Scratching @ 385 grams | 0 |
| Whiting @ 645 grams | 1 |
| Scratching @ 645 grams | 1 |

Resistance to wear was observed and measured for the ultra-violet (UV) curable surface coating according to the invention (Example 1). In particular, a tests were performed to measure the resistance of wear through the ultra-violet (UV) curable surface coating and to the decorative layer. The test protocol utilizes Teledyne Taber Abrading machine with 500 grams weight and S-32 wheel. A 4"×4" sample is mounted on a plate and S-42 sandpaper strips ½" wide is placed on the abrader wheel. Results were observed after every 50 revolutions. The sandpaper was also replaced after every 50 revolutions. The initial point (IP) is the point that wear-through to the decorative layer. For the light commercial application, the initial wear point is defined to be >2000 cycles and >4000 cycles for the commercial application. The initial point (IP) for the ultra-violet (UV) curable surface coating was observed at 4400 cycles.

The efficacy of antimicrobial additive for the ultra-violet (UV) curable surface coating according to the invention (Example 1) was measured. In particular, the efficacy of antimicrobial additive was observed and measured after 4000 cycles of scrubbing surface of the ultra-violet (UV) curable surface coating. ISO 22196 is an antimicrobial surface test that performs the measurement of antibacterial activity on plastics and other non-porous surfaces. Under ISO 22196 test, a test sample was abraded by the Gardner Abrasion tester 4000 times. The ultra-violet (UV) curable surface coating was constantly wet with disinfectant cleaner and 3 M white pad was used as a scrubbing pad to simulate 10 years of routine cleaning maintenance using a low speed scrubber and 3M white pad. Bacteria specified for the test are *Staphylococcus aureus* and *Escherichia coli*.

Table 6 displays results of measured surface properties of the exemplary embodiment of the ultra-violet (UV) curable surface coating according to the invention in Example 1 under the ISO 22196 test, detailed above. Antibacterial activity is measured as the difference in the logarithm of the viable cell counts found on an antibacterial-treated product and an untreated product after inoculation with and incubation bacteria. The antibacterial effectiveness of the additive is the ability of an antibacterial agent to inhibit the growth of bacteria on the surface of materials treated with an antibacterial agent as determined by the value of the antibacterial activity. The antibacterial effectiveness percentage (%) was measured as $1-1/(10^{antibacterial activity value})$.

TABLE 6

| Organisms | Antimicrobial Activity | Antimicrobial Effectiveness of Additive |
| --- | --- | --- |
| *Escherichia Coli* ATCC 8739 | 4.6 | 99.9975% |
| *Staphylococcus Aureus* | 6.0 | 99.9999% |

The DIN 51130 (also called German Ramp test) was performed on the ultra-violet (UV) curable surface coating according to the invention in Example 1 to determine the level of slip resistance of floorings, which shall be used at work places and work areas with slip danger. This test produces "R" values ranging from R9 to R13. If a floor is likely to be wet then r13 is best. Only R12 or R13 should be considered for swimming pool surrounds or changing areas. R11 may be suitable for transitional areas of floor that occasionally become wet despite efforts to keep it dry such as the entrance to a shopping mall or dry changing room floor. R10 may be suitable for areas of floor that can normally be kept dry and R9, the lowest value should only be considered for floors that can never become wet or have very few people using them. The test produced a R10 classification for the ultra-violet (UV) curable surface coating according to the invention, which qualifies the ultra-violet (UV) curable surface coating according to the invention as having high friction and low slip potential.

A standard test method for measuring surface frictional properties, as provided under ASTM E303, was also performed using a British Pendulum Skid Tester. This apparatus can measure the frictional resistance between a rubber slider mounted on the end of a pendulum arm and the surface of test product. The following Pendulum Friction Values were observed: (1) Dry Condition: 49, and Wet Condition: 37. This test also qualifies the ultra-violet (UV) curable surface coating according to the invention as having high friction and low slip potential.

The foregoing illustrates some of the possibilities for practicing the invention. Many other embodiments and fields of use for an LVT to the invention are possible and within the scope and spirit of the invention. It is, therefore, intended that the foregoing description be regarded as illustrative rather than limiting, and that the scope of the invention is given by the appended claims together with their full range of equivalents.

What is claimed is:

1. A surface covering, comprising:
a laminated panel;
an ultra-violet (UV) curable surface multi-part coating applied to the laminated panel having: a first coating with a first composition; and
a second coating with a second composition distinctive of the first composition of the first coating, the first coating cured in stages, in which the first coating is semi-cured at a first and lower energy, prior to application of the second coating,
the second coating applied onto the semi-cured first coating;
the UV curable surface multi-part coating finally cured at a second and higher energy sufficient to fully cure both the first coating and the second coating.

2. The surface covering of claim 1, wherein the surface covering further comprising a top layer.

3. The surface covering of claim 2, wherein top player includes a durable wear layer and an ornamental layer.

4. The surface covering of claim 3, wherein the ornamental layer is provided having a printed pattern.

5. The surface covering of claim 4, wherein the top layer further includes a transparent wear layer.

6. The surface covering of claim 5, wherein the laminated panel has a thickness of 4-6 mm.

7. The surface covering of claim 6, wherein the ultra-violet (UV) includes an antimicrobial additive.

8. The surface covering of claim 7, wherein the ultra-violet (UV) includes a wetting agent.

9. The surface covering of claim 8, wherein the ultra-violet (UV) includes a dispersing agent.

10. The surface covering of claim 9, wherein the ultra-violet (UV) includes a defoamer.

11. The surface covering of claim 10, wherein the ultra-violet (UV) includes a flatting agent.

12. The surface covering of claim 10, wherein the flatting agent is sued to control the gloss level of the ultra-violet (UV) curable surface coating.

13. The surface covering of claim 11, wherein the ultra-violet (UV) curable surface coating includes an oligomer.

14. The surface covering of claim 13, wherein the oligomer is an acrylate resin.

15. The surface covering of claim 14, wherein the ultra-violet (UV) curable surface coating includes an monomer.

16. The surface covering of claim 15, wherein the monomer includes a monofunctional monomer, a difunctional monomer, or a multi-functional monomer.

17. The surface covering of claim 16, wherein the ultra-violet (UV) curable surface coating includes a photoinitiator.

18. The surface covering of claim 17, wherein the photoinitiator selected from a group composed of a benzophenone, benzophenone derivatives, benzoin, benzoin derivatives, acetophenone, acetophenone derivatives, aromatic ketone amine systems.

19. The surface covering of claim 18, wherein the ultra-violet (UV) curable surface coating includes abrasive resistant particles.

20. The surface covering of claim 1, wherein the first coating and the second coating are maintained as distinct compositions through final curing.

* * * * *